(12) United States Patent
Mahurin et al.

(10) Patent No.: US 12,438,556 B2
(45) Date of Patent: Oct. 7, 2025

(54) SINGLE INSTRUCTION MULTIPLE DATA (SIMD) SPARSE DECOMPRESSION WITH VARIABLE DENSITY

(71) Applicant: QUALCOMM Incorporated, San Diego, CA (US)

(72) Inventors: Eric Wayne Mahurin, Austin, TX (US); Erich Plondke, Austin, TX (US); Hitesh Kumar Gupta, Sunnyvale, CA (US); Colin Beaton Verrilli, Apex, NC (US); Rexford Alan Hill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 18/339,797

(22) Filed: Jun. 22, 2023

(65) Prior Publication Data
US 2024/0118902 A1 Apr. 11, 2024

Related U.S. Application Data

(60) Provisional application No. 63/412,114, filed on Sep. 30, 2022.

(51) Int. Cl.
*H03M 7/30* (2006.01)

(52) U.S. Cl.
CPC ....... *H03M 7/6005* (2013.01); *H03M 7/3066* (2013.01); *H03M 7/6023* (2013.01)

(58) Field of Classification Search
CPC ........ H03M 7/16; H03M 7/063; H03M 7/098; H03M 7/0495; H03M 7/6023; H03M 7/3066; H03M 7/6005
See application file for complete search history.

(56) References Cited

U.S. PATENT DOCUMENTS

| | | | |
|---|---|---|---|
| 8,190,854 B2 * | 5/2012 | Codrescu | G06F 9/30021 712/3 |
| 10,725,740 B2 * | 7/2020 | Heddes | G06N 3/044 |
| 11,177,825 B2 * | 11/2021 | Romanovskii | G06F 12/0223 |
| 11,362,672 B2 | 6/2022 | Verrilli et al. | |
| 11,379,420 B2 | 7/2022 | Albericio et al. | |

(Continued)

OTHER PUBLICATIONS

International Search Report and Written Opinion—PCT/US2023/073959—ISA/EPO—Nov. 30, 2023.

(Continued)

*Primary Examiner* — Lam T Mai
(74) *Attorney, Agent, or Firm* — Loza & Loza LLP

(57) ABSTRACT

An aspect of the disclosure relates to a data processing system, including: an input medium configured to include a first set of blocks of data including a first set of block of compressed data and a first set of metadata, respectively; an output medium configured to include a first set of blocks of decompressed data each having a predetermined number of decompressed elements; and a set of single instruction multiple data (SIMD) processors configured to: access the first set of blocks of data from the input medium, respectively; decompress the first set of blocks of compressed data to generate the first set of blocks of decompressed data based on the first set of metadata, respectively; and provide the first set of blocks of decompressed data to the output medium, respectively.

24 Claims, 6 Drawing Sheets

(56) References Cited

U.S. PATENT DOCUMENTS

| | | | |
|---|---|---|---|
| 2016/0026607 A1* | 1/2016 | Codrescu | G06F 15/82 712/3 |
| 2016/0364147 A1* | 12/2016 | Mahurin | G06F 9/30043 |
| 2017/0046153 A1* | 2/2017 | Mahurin | G06F 9/30036 |
| 2017/0046156 A1* | 2/2017 | Mahurin | G06F 9/30003 |
| 2017/0046168 A1* | 2/2017 | Mahurin | G06F 9/30018 |
| 2018/0152733 A1* | 5/2018 | Karaje | H04N 19/14 |
| 2020/0373941 A1 | 11/2020 | Latorre et al. | |
| 2021/0149811 A1* | 5/2021 | Appu | G06F 12/0846 |
| 2021/0194498 A1* | 6/2021 | Redfern | H03M 7/6029 |
| 2021/0295168 A1* | 9/2021 | Xu | G06N 3/084 |
| 2021/0397927 A1* | 12/2021 | Chen | G06N 3/063 |
| 2022/0012592 A1* | 1/2022 | Jain | G06N 3/08 |
| 2022/0114454 A1* | 4/2022 | Park | G06N 3/063 |

OTHER PUBLICATIONS

Knorr F., et al., "ndzip: A High-Throughput Parallel Lossless Compressor for Scientific Data", 2021 Data Compression Conference (DCC), IEEE, Mar. 23, 2021, pp. 103-112, XP033912683, Sections "Introduction", "Algorithm", "Residual Value Encoding", "Thread Parallelism".

\* cited by examiner

SINGLE INSTRUCTION MULTIPLE DATA (SIMD) SPARSE DECOMPRESSION WITH VARIABLE DENSITY

CROSS-REFERENCE TO RELATED APPLICATION

This application claims the benefit of the filing date of Provisional Application Ser. No. 63/412,114, filed on Sep. 30, 2022, which is incorporated herein by reference.

FIELD

Aspects of the present disclosure relate generally to data decompression, and in particular, to a single instruction multiple data (SIMD) sparse decompression with variable density.

BACKGROUND

Various data processing applications require fast memory access and processing of data to meet real time requirements for applications. To implement such fast memory access and processing of data, some processing system are implemented as single instruction multiple data (SIMD), where a set of processors access a set of different blocks of data from memory, and process blocks of data in parallel, respectively. Improving the access and processing of the data to improve speed and provide seamless on-the-fly operations is of interest herein.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to a data processing system. The data processing system includes an input medium configured to include a first set of blocks of data including a first set of blocks of compressed data and a first set of metadata, respectively;
an output medium configured to include a first set of block of decompressed data each having a predetermined number of decompressed elements; and a set of single instruction multiple data (SIMD) processors configured to: access the first set of blocks of data from the input medium, respectively; decompress the first set of blocks of compressed data to generate the first set of blocks of decompressed data based on the first set of metadata, respectively; and provide the first set of blocks of decompressed data to the output medium, respectively.

Another aspect of the disclosure relates to a data processing system. The data processing system includes an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data; an output medium configured to include a first block of decompressed data including a first set of sub-blocks of decompressed data with the same predetermined number of decompressed elements in a second set of data lanes, respectively; and a set of SIMD processors configured to: access the first set of sub-blocks of data from the input medium, respectively; decompress the first set of sub-blocks of compressed data to generate the first set of sub-blocks of decompressed data based on the first set of metadata, respectively; and provide the first set of sub-blocks of decompressed data to the output medium.

Another aspect of the disclosure relates to a machine learning (ML) data processing system. The ML data processing system includes an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data; an output medium configured to include a first block of decompressed data including a first set of sub-blocks of decompressed data with the same number of decompressed elements in the set of SIMD data lanes, respectively; a set of SIMD processors configured to: access the first set of sub-blocks of data from the input medium, respectively; decompress the first set of sub-blocks of compressed data to generate the first set of sub-blocks of decompressed data based on the first set of metadata, respectively; and provide the first set of sub-blocks of decompressed data to the output medium; and a machine learning (ML) processor configured to: access the first set of sub-blocks of decompressed data from the output medium, wherein the first set of sub-blocks of decompressed includes machine learning (ML) weights; and apply the ML weights to a set of input signals to generate a set of output signals.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various data processing applications require fast memory access and processing of data to meet real time requirements for various applications. To implement such fast memory access and processing of data, some data processing systems employ single instruction multiple data (SIMD), where a set of processors access a set of different blocks of data from memory, and perform the same process on the blocks of data in parallel, respectively.

Further, an additional consideration is the amount of data to be accessed in parallel for on-the-fly processing via a SIMD processing system. For example, the set of different blocks of data may be compressed and stored in a vector register memory, which is suitable for parallel data accessing. In such case, a set of parallel processors simultaneously access the blocks of compressed data from the vector register memory, and decompress the blocks of compressed data to generate blocks of decompressed data, respectively. The blocks of decompressed data may then be used for a particular application, such as machine learning (ML) processing, where the blocks of decompressed data may represent weights and/or biases in accordance with an inference ML algorithm.

Figure 1:
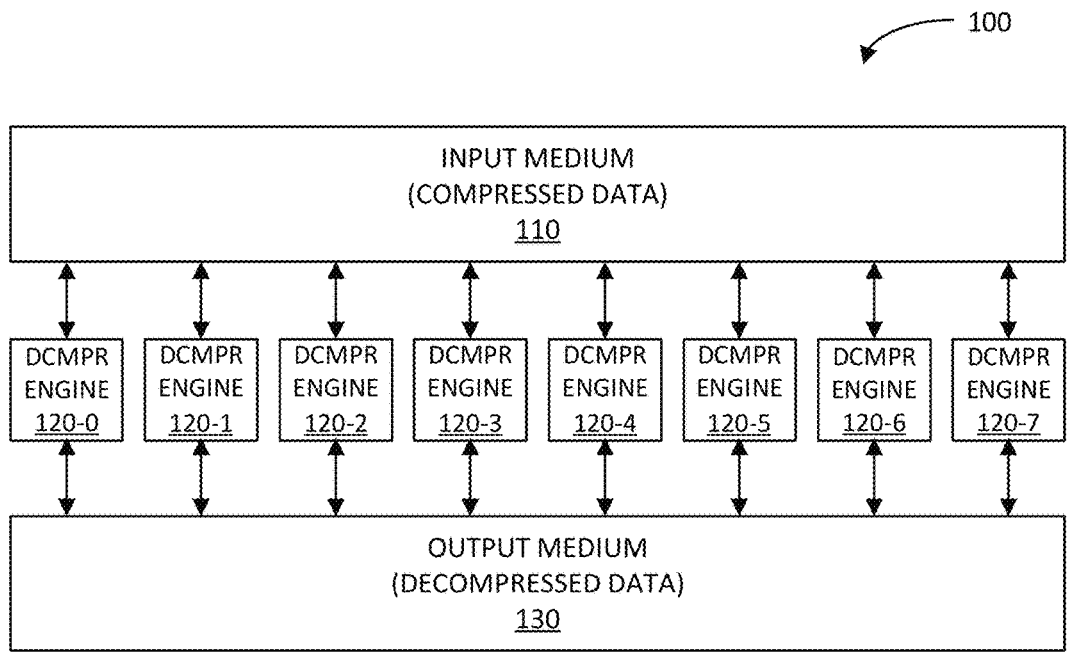
FIG. 1 illustrates a block diagram of an example data processing system in accordance with an aspect of the disclosure.

FIG. 1 illustrates a block diagram of an example data processing system 100 in accordance with an aspect of the disclosure. The data processing system 100 includes an input medium 110 configured to include blocks of compressed data arranged in a set of vectors logically divided into a set of single instruction multiple data (SIMD) data lanes, as discussed further herein. The input medium 110 may be any type of memory (e.g., random access memory (RAM), read only memory (ROM), non-volatile memory, volatile memory, etc.) or may be a data transient medium (e.g., a data bus, set of registers, cache memory, etc.), where data may be received from a network for on-the-fly operations.

The data processing system 100 further includes a set of parallel SIMD processors 120-0 to 120-7, referred to herein as decompression engine processors as they perform the decompression of blocks of compressed data accessed from the input medium 110. Although, in this example, there are eight (8) parallel processors 120-0 to 120-7, it shall be understood that the data processing system 100 may include any number of parallel SIMD processors.

Additionally, the data processing system 100 may further include an output medium 130 configured to include blocks of decompressed data generated by the set of parallel SIMD processors 120-0 to 120-7. The output medium 130 may also be any type of memory (e.g., RAM, ROM, non-volatile memory, volatile memory, etc.) or may be a data transient medium (e.g., a data bus, set of registers, cache memory, etc.), where data may be provided to a network for on-the-fly operations. The blocks of decompressed data may also be arranged in a set of vectors logically divided into a corresponding set of SIMD data lanes, as discussed further herein. Such data processing system 100 may be suitable for on-the-fly accessing and decompressing blocks of compressed data in SIMD data lanes from the input medium 110 by the set of parallel SIMD processors 120-0 to 120-7, and to provide the resulting blocks of decompressed data in SIMD data lanes to the output medium 130 for accessing by an applications processor.

Figure 2:
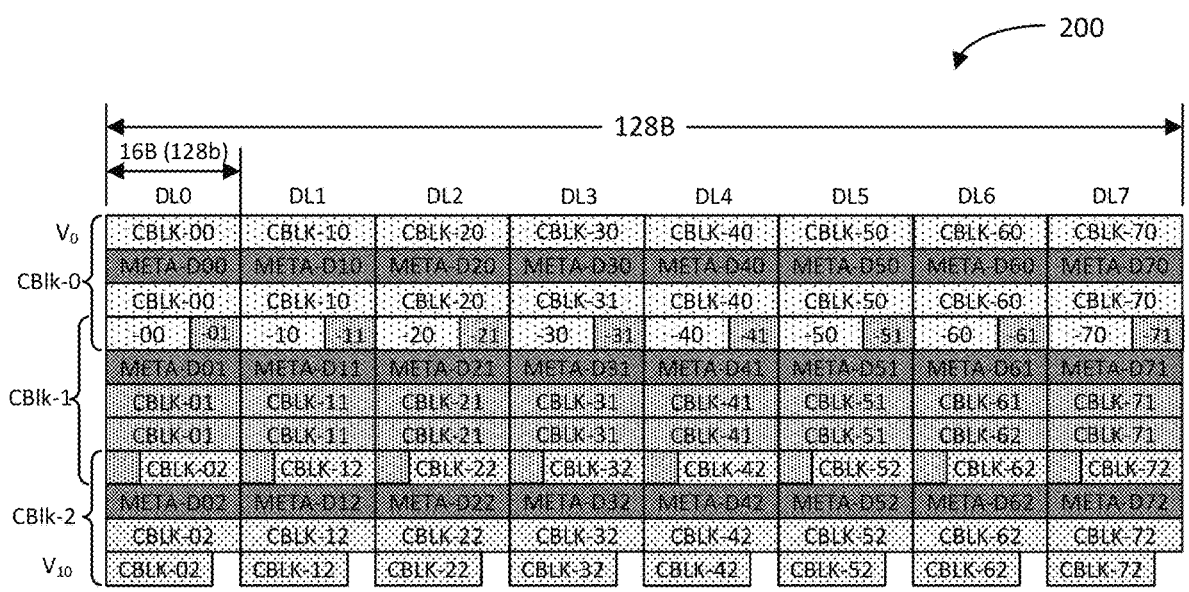
FIG. 2 illustrates a diagram of an example compressed data format in accordance with another aspect of the disclosure.

FIG. 2 illustrates a diagram of an example compressed data format 200 in accordance with another aspect of the disclosure. As previously discussed, the input medium 110 may include a set of compressed data blocks for on-the-fly parallel access and decompression by the set of decompression engine SIMD processors 120-0 to 120-7, respectively.

In particular, the compressed data format 200 is arranged in a set of vectors $V_0$ to $V_{10}$ depicted as rows. In this example, there are 11 vectors as shown for explanation purposes, but it shall be understood that the input medium 110 may include many more (or less) vectors. Further, in accordance with this example, each vector has a size of 128 Bytes of data (128B). Again, it shall be understood the vectors may have different sizes (e.g., $2^n$ size) depending on the application. Each vector may have an address range from left boundary to right boundary of $V_X[9:0]=0$ to $V_X[9:0]=1023$, where X represents the particular vector.

Additionally, the vectors $V_0$ to $V_{10}$ are logically arranged in SIMD data lanes, with each data lane having a data width of 16 B or 128 bits (128b) (e.g., or any $2^m$ size). As used herein, the capital "B" indicates bytes of data, and the small "b" indicates bits of data. Accordingly, in this example, there are eight (8) data lanes DL0 to DL7 across the vector (row) dimension. Thus, address-wise along the vector dimension, data lane DL0 extends from $V_X[9:0]=0$ to $V_X[9:0]=127$; data lane DL1 extends from $V_X[9:0]=128$ to $V_X[9:0]=255$; data lane DL2 extends from $V_X[9:0]=256$ to $V_X[9:0]=383$; data lane DL3 extends from $V_X[9:0]=384$ to $V_X[9:0]=511$; data lane DL4 extends from $V_X[9:0]=512$ to $V_X[9:0]=639$; data lane DL5 extends from $V_X[9:0]=640$ to $V_X[9:0]=767$; data lane DL6 extends from $V_X[9:0]=768$ to $V_X[9:0]=895$; and data lane DL7 extends from $V_X[9:0]=896$ to $V_X[9:0]=1023$. The set of decompression engine SIMD processors 120-0 to 120-7 are configured to access data in the set of data lanes DL0 to DL7, respectively.

In this example, a sub-block of data per data lane includes a set of compressed data and a corresponding metadata. A block of data pertains to a set of sub-blocks of data across the set of data lanes DL0 to DL7, as the set of parallel processors 120-0 to 120-7 collectively access the set of sub-blocks of data in parallel for decompression purposes, respectively. With regard to each sub-block of data, the metadata provides information to the corresponding decompression engine processor as to how to decompress the set of compressed data. Further, in this example, the arrangement of each sub-block of data includes at least a first portion of compressed data in a first vector ($V_k$), the metadata in a following second vector ($V_{k+1}$), and one or more portions of compressed data in one or more vectors ($V_{k+2}$ et seq.) following the second vector ($V_{k+1}$) depending on the size of the compressed data. Accordingly, in this example, the sub-block of compressed data is interleaved with the corresponding metadata.

For example, the sub-block of data (-00), where the first number represents the data lane, and the second number represents the block number) in data lane DL0 extends over vectors $V_X$=0 to 3 (where X indicates the vector or row starting from top to bottom). The sub-block of data-00 includes a first portion of compressed data (CBLK-00) at $V_0[9:0]$=0 to 128 (all CBLK-00 portions are represented by light shaded rectangles), the metadata at $V_1[9:0]$ 0 to 128 (represented by the darkest shaded rectangle), a second portion of compressed data (CBLK-00) at $V_2[9:0]$=0 to 128, and a third portion of compressed data (denoted as -00 for short) at $V_3[9:0]$=0 to 79. Thus, it may be said that the first sub-block of data extends continuously from $V_0[9:0]$=0 to $V_3[9:0]$=79 across vectors $V_0$ to $V_3$ within data lane DL0.

As discussed further herein in more detail, the sub-blocks of data within the same block across the data lanes DL0 to DL7 are configured to have the same amount of data (e.g., the sum of the corresponding compressed data and metadata). Accordingly, with regard to block of data CBlk-0, the sub-blocks of data in the data lanes DL1 to DL7 may have the same start and end addresses as the sub-block of data (-00) of data lane DL0, but offset in the vector (row) dimension by 1*128 b to 7*128 b, respectively. For example, the sub-block of data (-10) in data lane DL1 extends from $V_0[9:0]$=128 to $V_3[9:0]$=207; the sub-block of data (-20) in data lane DL2 extends from $V_0[9:0]$=256 to $V_3[9:0]$=335; the sub-block of data (-30) in data lane DL3 extends from $V_0[9:0]$=384 to $V_3[9:0]$=463; the sub-block of data (-40) in data lane DL4 extends from $V_0[9:0]$=512 to $V_3[9:0]$=591; the sub-block of data (-50) in data lane DL5 extends from $V_0[9:0]$=640 to $V_3[9:0]$=719; the sub-block of data (-60) in data lane DL6 extends from $V_0[9:0]$=768 to $V_3[9:0]$=847; and the sub-block of data (-70) in data lane DL7 extends from $V_0[9:0]$=896 to $V_3[9:0]$=975.

The next block of data (CBlk-1) extends over vectors $V_3$ to $V_7$. Note that the end addresses of the set of sub-blocks-00 to -70 of data block CBlk-0 did not end at the right boundaries of the data lanes DL0 to DL7 (which are at $V_X[9:0]$=127, 255, 383, 511, 639, 767, 895, and 1023, respectively). Rather, the set of sub-blocks-00 to -70 ended at addresses $V_X[9:0]$=79, 207, 335, 463, 591, 719, 847, and 975, respectively. So that full use of the input medium 110 is achieved, the sub-blocks-01 to -71 of data block CBlk-1 begin at $V_3[9:0]$=80, 208, 336, 464, 592, 720, 848, and 976, respectively. Thus, the vector $V_3$ is partially filled with data block CBlk-0 and data block CBlk-1.

For example, the sub-block of data-01 includes a first portion of compressed data (CBLK-01) at $V_3[9:0]$=80 to 128 (all CBLK-01 portions are represented by medium-dark shaded rectangles), the metadata at $V_4[9:0]$ 0 to 128 (represented by the darkest shaded rectangle), a second portion of compressed data (CBLK-01) at $V_5[9:0]$=0 to 128, a third portion of compressed data (CBLK-01) at $V_6[9:0]$=0 to 128, and a fourth portion of compressed data at $V_7[9:0]$=0 to 31. Thus, it may be said that the sub-block of data-01 extends continuously from $V_3[9:0]$=80 to $V_7[9:0]$=31 across vectors $V_3$ to $V_7$ within data lane DL0.

As previously discussed, the sub-blocks of data within the same block across the data lanes DL0 to DL7 are configured to have the same amount of data (e.g., the sum of the compressed and metadata). Accordingly, with regard to block of data CBlk-1, the sub-blocks of data in the data lanes DL1 to DL7 may have the same start and end addresses as the sub-block of data (-01) of data lane DL0, but offset in the vector (row) dimension by 1*128 b to 7*128 b, respectively. For example, the sub-block of data (-11) in data lane DL1 extends from $V_3[9:0]$=208 to $V_7[9:0]$=159; the sub-block of data (-21) in data lane DL2 extends from $V_3[9:0]$=336 to $V_7[9:0]$=287; the sub-block of data (-31) in data lane DL3 extends from $V_3[9:0]$=464 to $V_7[9:0]$=415; the sub-block of data (-41) in data lane DL4 extends from $V_3[9:0]$=592 to $V_7[9:0]$=543; the sub-block of data (-51) in data lane DL5 extends from $V_3[9:0]$=720 to $V_7[9:0]$=671; the sub-block of data (-61) in data lane DL6 extends from $V_3[9:0]$=848 to $V_7[9:0]$=799; and the sub-block of data (-71) in data lane DL7 extends from $V_3[9:0]$=976 to $V_7[9:0]$=927.

Similarly, the block of data (CBlk-2) extends over vectors $V_7$ to $V_{10}$. Note that the end addresses of the set of sub-blocks-01 to -71 of block of data CBlk-1 also did not end at the right boundaries of the data lanes DL0 to DL7 (which are at $V_X[9:0]$=127, 255, 383, 511, 639, 767, 895, and 1023, respectively). Rather, the set of sub-blocks-01 to -71 ended at addresses $V_X[9:0]$=31, 159, 287, 415, 543, 671, 799, and 927, respectively. So that full use of the input medium 110 is achieved, the sub-blocks-02 to -72 of block of data CBlk-2 begin at $V_7[9:0]$=32, 160, 288, 416, 544, 672, 800, and 928, respectively. Thus, the vector $V_7$ is also partially filled with data block CBlk-1 and data block CBlk-2.

For example, the sub-block of data-02 includes a first portion of compressed data (CBLK-02) at $V_7[9:0]$=32 to 128 (all CBLK-02 portions are represented by medium-light shaded rectangles), the metadata at $V_8[9:0]$ 0 to 128 (represented by the darkest shaded rectangle), a second subset of compressed data (CBLK-02) at $V_9[9:0]$=0 to 128, and a third subset of compressed data (CBLK-02) at $V_{10}[9:0]$=0 to 101. Thus, it may be said that the sub-block of data-02 extends continuously from $V_7[9:0]$=32 to $V_{10}[9:0]$=101 across vectors $V_7$ to $V_{10}$ within data lane DL0.

As previously discussed, the sub-blocks of data within the same block across the data lanes DL0 to DL7 are configured to have the same amount of data (e.g., the sum of the compressed and metadata). Accordingly, with regard to block of data CBlk-2, the sub-blocks of data in the data lanes DL1 to DL7 may have the same start and end addresses as the sub-block of data (-02) of data lane DL0, but offset in the vector (row) dimension by 1*128 b to 7*128 b, respectively. For example, the sub-block of data (-12) in data lane DL1 extends from $V_7[9:0]$=160 to $V_{10}[9:0]$=229; the sub-block of data (-22) in data lane DL2 extends from $V_7[9:0]$=288 to $V_{10}[9:0]$=357; the sub-block of data (-32) in data lane DL3 extends from $V_7[9:0]$=416 to $V_{10}[9:0]$=485; the sub-block of data (-42) in data lane DL4 extends from $V_7[9:0]$=544 to $V_{10}[9:0]$=613; the sub-block of data (-52) in data lane DL5 extends from $V_7[9:0]$=672 to $V_{10}[9:0]$=741; the sub-block of data (-62) in data lane DL6 extends from $V_7[9:0]$=800 to $V_{10}[9:0]$=869; and the sub-block of data (-72) in data lane DL7 extends from $V_7[9:0]$=928 to $V_{10}[9:0]$=997.

Blocks of data CBlk-4 and beyond (not shown) may be arranged in a similar manner as discussed with blocks of data CBlk-0 to CBlk-3. Although, in this example, the sub-blocks of data-00 to -70 of data block CBlk-0 begin at the left boundaries of data lanes DL0 to DL7, it shall be understood that such sub-blocks may begin at an offset from the left boundaries of data lanes DL0 to DL7. Further, as discussed, although the size of the sub-blocks in a particular block of data is the same across the data lanes, the size of the sub-blocks may be different (e.g., programmable) from data block to data block. For example, the size of data block CBlk-0 may be different than the size of data block CBlk-1, and the size of data block CBlk-2 may be different than the sizes of data block CBlk-0 and/or CBlk-1.

Figure 3:
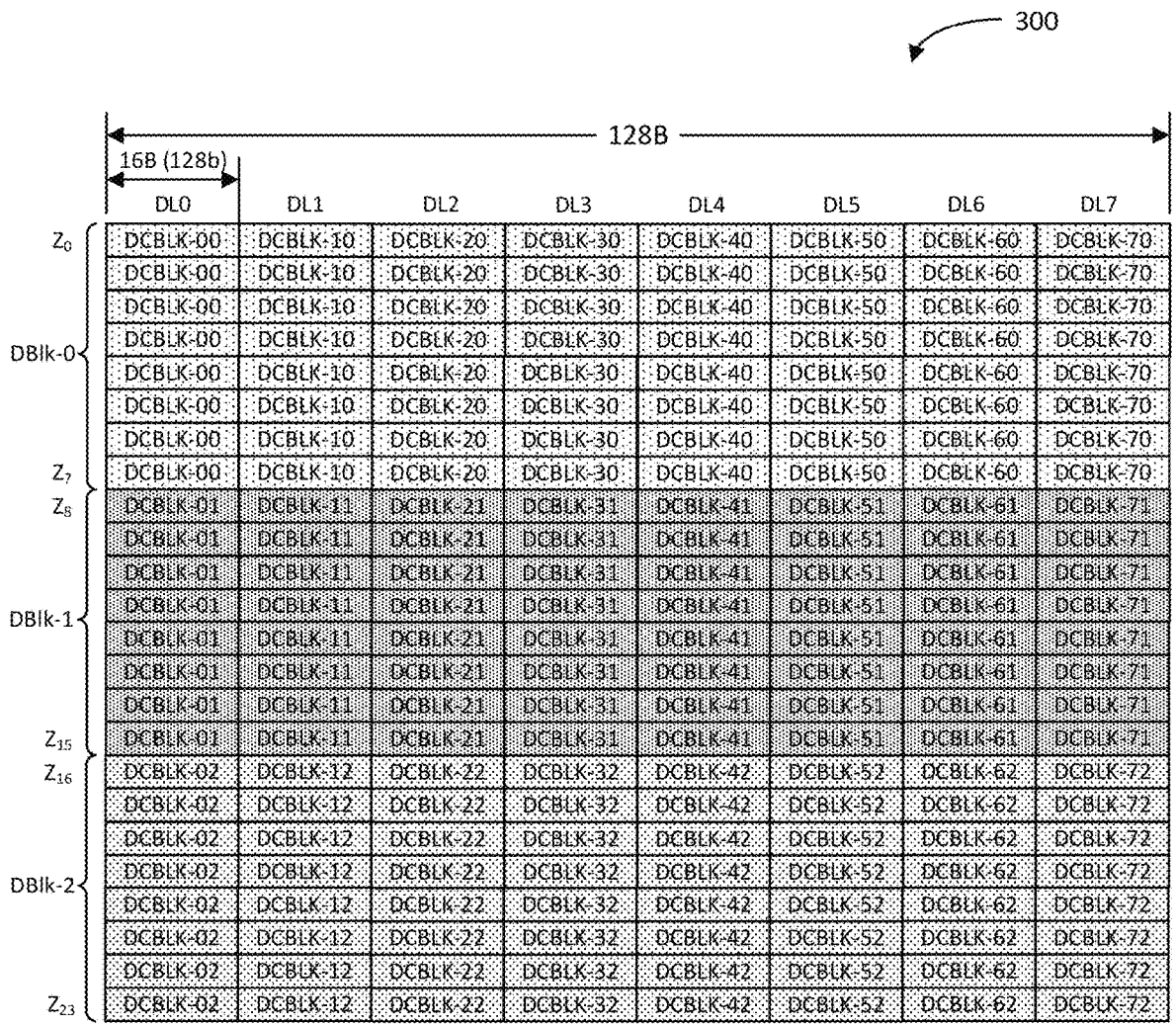
FIG. 3 illustrates a diagram of an example decompressed data format in accordance with another aspect of the disclosure.

FIG. 3 illustrates a diagram of an example decompressed data format in accordance with another aspect of the disclosure. As previously discussed, a set of blocks of decompressed data generated by the set of decompression engine processors 120-0 to 120-7 may be provided to the output medium 130 for on-the-fly operation.

In particular, the decompressed data format 300 includes a set of vectors $Z_0$ to $Z_{23}$ arranged in rows. In this example, 24 vectors are shown for explanation purposes, but it shall be understood that the output medium 130 may include many more (or less) vectors.

Further, in accordance with this example, each vector has a memory size of 128 B (e.g., generally, any $2^n$ size). Again, it shall be understood the vectors may have different memory sizes depending on the application. Each vector may have an address range from left boundary to right boundary of $Z_X[9:0]=0$ to $Z_X[9:0]=1023$, where X represents the particular vector (row).

Similarly, the vectors $Z_0$ to $Z_{23}$ are logically arranged in data lanes, with each data lane having a data width of 16 B or 128 b (e.g., generally, any $2^m$ size). In this example, there are eight (0) data lanes DL0 to DL7 across the vector (row) dimension. Thus, along the vector dimension, data lane DL0 extends from $Z_X[9:0]=0$ to $Z_X[9:0]=127$; data lane DL1 extends from $Z_X[9:0]=128$ to $Z_X[9:0]=255$; data lane DL2 extends from $Z_X[9:0]=256$ to $Z_X[9:0]=383$; data lane DL3 extends from $Z_X[9:0]=384$ to $Z_X[9:0]=511$; data lane DL4 extends from $Z_X[9:0]=512$ to $Z_X[9:0]=639$; data lane DL5 extends from $Z_X[9:0]=640$ to $Z_X[9:0]=767$; data lane DL6 extends from $Z_X[9:0]=768$ to $Z_X[9:0]=895$; and data lane DL7 extends from $Z_X[9:0]=896$ to $Z_X[9:0]=1023$.

The decompression of the blocks of compressed data CBlk-0 to CBlk-2 performed by the set of decompression engine processors 120-0 to 120-7 form equally-sized blocks of decompressed data DBlk-0 to DBlk-2, respectively. The size of the blocks of decompressed data may also be programmable. For example, the decompression of compressed block of data CBlk-0 form a block of decompressed data DBlk-0 with size 128 B by 8 B, with decompressed sub-blocks DCBLK-00 to DCBLK-70 (represented as light shaded rectangles) corresponding to compressed sub-blocks of data CBLK-00 to CBLK-70, respectively. The block of decompressed data DBlk-0 extends eight (8) vectors $Z_0$ to $Z_7$, respectively.

The decompression of compressed block of data CBlk-1 form a block of decompressed data DBlk-1 also with the same size of 128 B by 8 B, with decompressed sub-blocks DCBLK-01 to DCBLK-71 (represented as dark shaded rectangles) corresponding to compressed sub-blocks of data CBLK-01 to CBLK-71, respectively. The block of decompressed data DBlk-1 extends eight (8) vectors $Z_8$ to Zis, respectively. The decompression of compressed block of data CBlk-2 form a block of decompressed data DBlk-2 also with the same size of 128 B by 8 B, with decompressed sub-blocks DCBLK-02 to DCBLK-72 (represented as medium shaded rectangles) corresponding to compressed sub-blocks of data CBLK-02 to CBLK-72, respectively. The block of decompressed data DBlk-2 extends eight (8) vectors $Z_{16}$ to $Z_{23}$, respectively.

Figure 4:
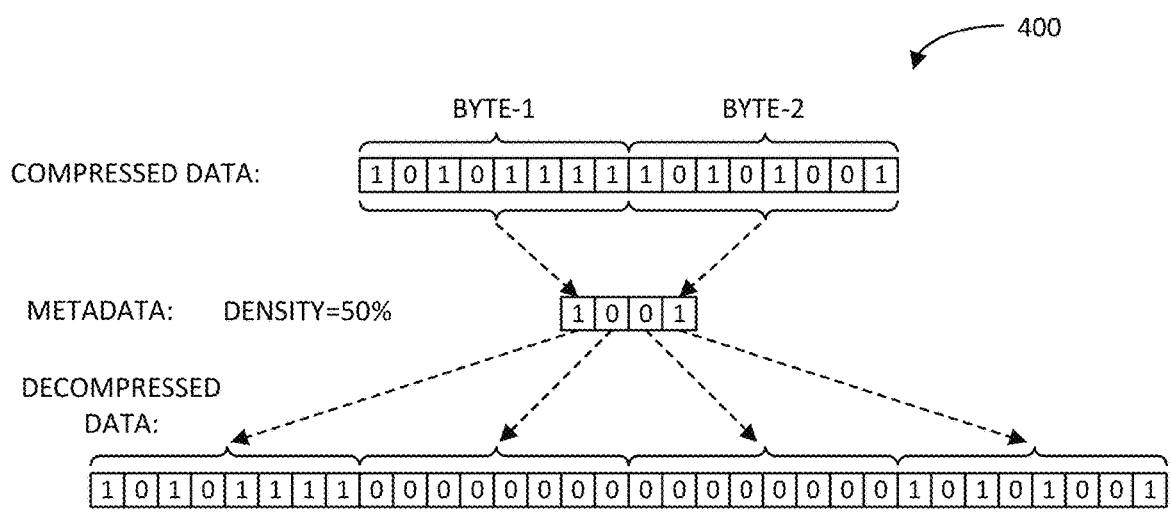
FIG. 4 illustrates a diagram related to an example method of decompressing compressed data in accordance with another aspect of the disclosure.

FIG. 4 illustrates a diagram related to an example method 400 of decompressing compressed data in accordance with another aspect of the disclosure. As illustrated, the compressed data, metadata, and decompressed data may be partial examples of compressed data (e.g., CBLK-00), the corresponding metadata (e.g., META-D00), and the corresponding decompressed data (DCBLK-00). In this example, the compressed data includes two compressed elements (e.g., bytes): the first byte (BYTE-1) is 10101111, and the second byte (BYTE-2) is 10101001. In this example, a compressed element has a size of one byte, but it shall be understood that the size of a compressed element may be different.

The metadata is 1001. The metadata indicates the number of compressed elements based on the number of one (1) bit value it has. Accordingly, in this example, the metadata indicates that there are two (2) compressed elements (e.g., BYTE-1 and BYTE-2) in the corresponding block of compressed data. The metadata also indicates the number of decompressed elements in the corresponding block of decompressed data by the total number of bits it has (e.g., four (4), corresponding to four (4) compressed elements in the corresponding block of decompressed data).

Accordingly, the metadata has a density of 50 percent (%) ones (is); that is, two (2) ones (is) out of four (4) bits. The density relates to the ratio of compressed elements in the block of compressed data to decompressed elements in the corresponding block of decompressed data. Accordingly, if the number of compressed elements is two (2) (e.g., two (2) bytes), with the metadata having a 50% density, the number of decompressed elements is four (4) (e.g., four (4) bytes).

The decompression of the compressed data operates as follows: if a bit in the metadata is a one (1) (generally, a first particular bit value), then copy the next compressed element (e.g., byte) of the block of compressed data to the next decompressed element (e.g., byte) of the block of decompressed data; if the bit in the metadata is a zero (0) (generally, a second particular bit value), then substitute a zero (0) for the next decompressed element of the block of decompressed data. Although, in this example, the size of a compressed element is one (1) byte, and the size of a decompressed element is one (1) byte, it shall be understood that a compressed element and a decompressed element may have different sizes.

Continuing the example, the first bit in the metadata is a one (1), then the corresponding or next first byte of decompressed data is the first byte (BYTE-1) of the compressed data, i.e., 1010111. The second bit in the metadata is a zero (0), then the second byte of decompressed data is a zero byte, i.e., 00000000. The third bit in the metadata is a zero (0), then the third byte of decompressed data is a zero byte, i.e., 00000000. The fourth bit in the metadata is a one (1), then the corresponding fourth byte of decompressed data is the second byte (BYTE-2) of the compressed data, i.e., 10101001.

Note that the metadata is in the decompressed data domain; that is, there is a one-to-one bit-to-byte correspondence between the metadata and the decompressed data. Although in this example, a one (1) bit in the metadata indicates copy the compressed byte to the decompressed byte and a zero (0) bit indicates put a zero (0) byte into the corresponding decompressed byte, it shall be understood that the bit value is arbitrarily defined, and a zero (0) could indicate copy of compressed byte into the corresponding decompressed data, and a one (1) could indicate put a zero (0) byte into the corresponding decompressed byte.

In the example of FIGS. 2-3, the size of a block of decompressed data may be fixed or a constant (e.g., 128B); but could also be programmable. However, the size of a block of compressed data may vary depending on the density of ones (1s) in the metadata. For example, if the density is 25%, then the size of the corresponding block of compressed data is 32 B. If the density is 15.6%, then the size of the corresponding block of compressed data is 20 B. Thus, the size of a block of compressed data is equal to the corresponding density multiplied by the size of a block of decompressed data.

Accordingly, the density also indicates the sparsity of compressed data (e.g., there is a small number of compressed data bytes compared to zero compressed data bytes).

Therefore, if the set of decompression engine processors 120-0 to 120-7 know the density associated with a particular block of data (e.g., the density is predetermined) and the predetermined size of the block of decompressed data, then the set of decompression engine processors 120-0 to 120-7 may be able to determine the size of corresponding sub-blocks of compressed data, and may use the size to determine the start and ending addresses of the corresponding sub-blocks for accessing purposes.

Figure 5:
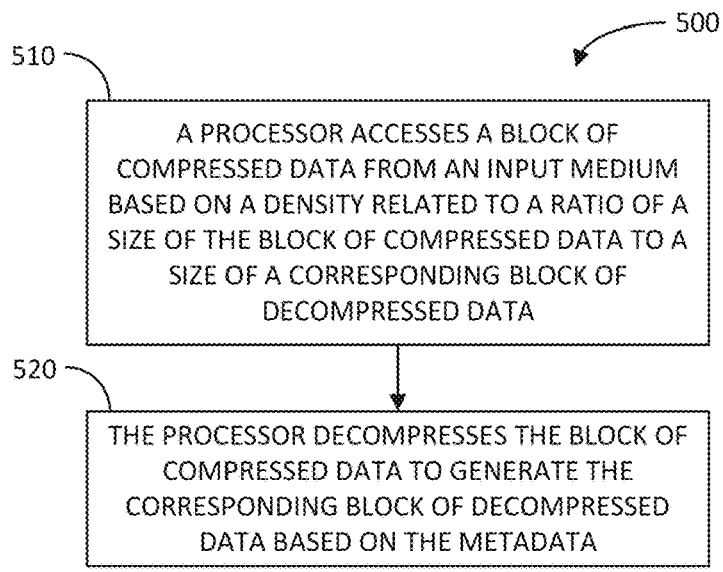
FIG. 5 illustrates a flow diagram of an example method of decompressing compressed data in accordance with another aspect of the disclosure.

FIG. 5 illustrates a flow diagram of an example method 500 of decompressing a block or sub-block of compressed data in accordance with another aspect of the disclosure. The method 500 may be implemented by one of the set of decompression engine SIMD processors 120-0 to 120-7 (e.g., processor 120-0).

The method 500 includes a processor (e.g., 120-0) accessing a block (e.g., or a sub-block, as it is an arbitrary data size term) of compressed data (e.g., CBLK-00) from an input medium (e.g., 110) based on a density (e.g., number of ones (1s) in the corresponding metadata (META-D00)) related to a ratio of the size of the block of compressed data (e.g., CBLK-00) to a size of a corresponding block of decompressed data (e.g., DCBLK-00) (block 510). As previously mentioned, if the processor knows the density (e.g., the density is predetermined) and the size of a block of decompressed data (e.g., which may also be predetermined), the processor may determine the size of the block of compressed data. And using the size, the processor may determine the start and end addresses of the block of data to be accessed including the compressed data and the corresponding metadata.

Then, according to the method 500, the processor (e.g., 120-0) decompresses the block (or sub-block) of compressed data (e.g., CBLK-00) to generate the corresponding block of decompressed data (e.g., DCBLK-00) based on the metadata (e.g., META-D00) (block 520). As discussed with reference to method 400, the metadata instructs the processor when to copy the next compressed element (e.g., byte) of compressed data into the next decompressed element (e.g., byte) of decompressed data (e.g., if the metadata bit is a one (1)), and when to put a zero into the next decompressed element (e.g., byte) of decompressed data (e.g., if the metadata bit is a zero (0)). The processor may then provide the block of decompressed data to an output medium (e.g., 130).

Figure 6:
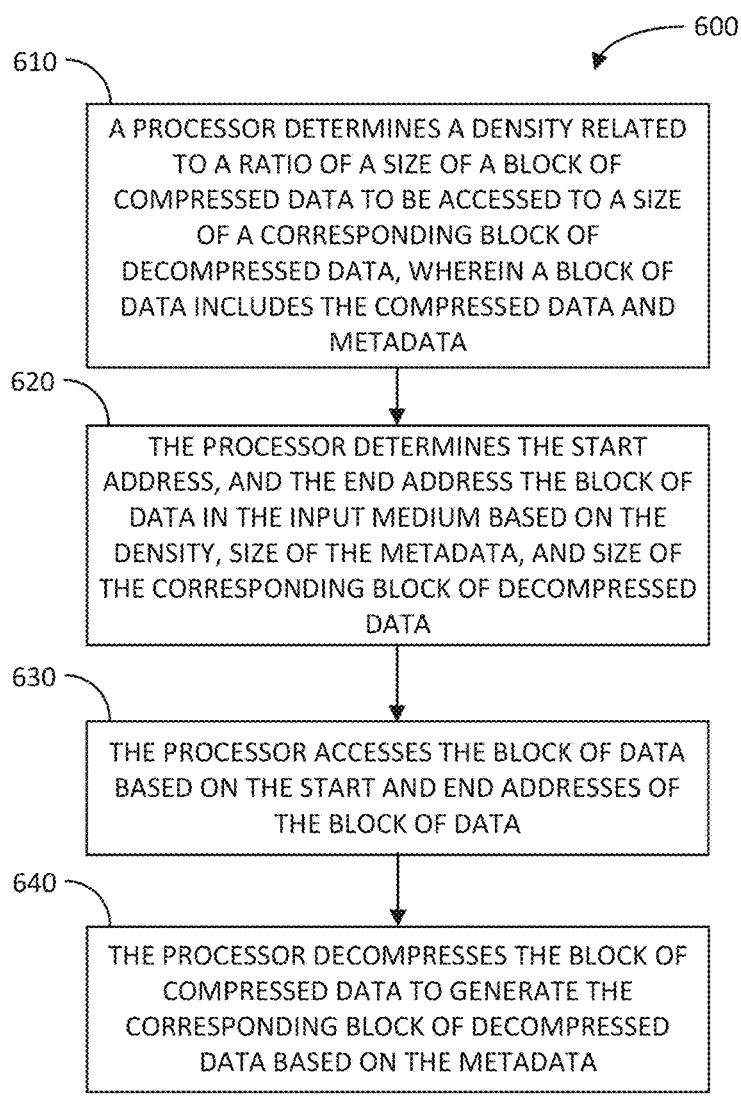
FIG. 6 illustrates a flow diagram of another example method of decompressing compressed data in accordance with another aspect of the disclosure.

FIG. 6 illustrates a flow diagram of another example method 600 of decompressing a block (or sub-block) of compressed data in accordance with another aspect of the disclosure. The method 600 may be an example more detailed implementation of the method 500 previously discussed. The method 600 may be implemented by one of the set of decompression engine processors 120-0 to 120-7 (e.g., processor 120-0).

The method 600 includes a processor (e.g., 120-0) determining a density related to a ratio of a size (number of compressed elements) of a block (or sub-block) of compressed data to be accessed (e.g., CBLK-00) to a size (number of decompressed elements) of a corresponding block (or sub-block) of decompressed data (e.g., DCBLK-00), wherein a block (or sub-block) of data includes the block (or sub-block) of compressed data (e.g., CBLK-00) and a metadata (e.g., META-D00) (block 610). The processor (e.g., 120-0) may have the density information apriori (e.g., it may be predetermined, or when the processor, which could also serve as a compression engine processor, compressed the data). Or, the processor (e.g., 120-0) may access the metadata to determine the density (e.g., number of one (1s) in the metadata) to determine the size of a block of data, where the size may be equal to the combined size of the metadata and the size of a block (or sub-block) of compressed data (e.g., which is equal to the density*size of a corresponding block of decompressed data).

Then, according to the method 600, the processor (e.g., 120-0) determines the start address, and the end addresses of the block of data (e.g., BCLK-00 and META-D00) in the memory based on the density, the size of the metadata (e.g., META-D00), and the size of the corresponding block of decompressed data (e.g., DCBLK-00) (block 620). For example, if the block of data is the first block to be accessed, it may by default start at the beginning of the address space of the input medium 110 (e.g., at $V_0[9:0]=0$). If the block of data is a block accessed after the first block, it may start at the bit after the end of the previously accessed block of data (e.g., at $V_3[9:0]=80$ for sub-block-01). The end address of the block of data to be accessed is the start address plus the size of the block of data.

As an example, the processor 120-0 may determine the size of the block of data as the size of the metadata (e.g., 128b) plus the size of the block (or sub-block) of compressed data (e.g., which may be determined by multiplying the fixed or predetermined size of a block of decompressed data with the density, e.g., 128B*density). For example, for a density of 42/128, the processor 120-0 may determine the size to be 128b+128B*(42/128)=464b. The first three vectors $V_0$ to $V_2$ in a data lane, consumed by two sub-blocks of compressed data and the metadata, may be 384b. Then, the end address of the block of data would then be in the fourth vector at $V_3[9:0]=79$ (464b−384b−1=79).

Then, according to the method 600, the processor (e.g., 120-0) accesses the block of data (e.g., CBLK-00+META-D00) based on the start and end addresses (e.g., $V_0[9:0]=0$ and $V_3[9:0]=79$) (block 630). The method 600 further includes the processor (e.g., 120-0) decompressing the block (or sub-block) of compressed data (e.g., CBLK-00) to generate a block of decompressed data (e.g., DCBLK-00) based on the metadata (e.g., META-D00) (block 640). The processor may then provide the block of decompressed data to an output medium (e.g., 130).

Figure 7:
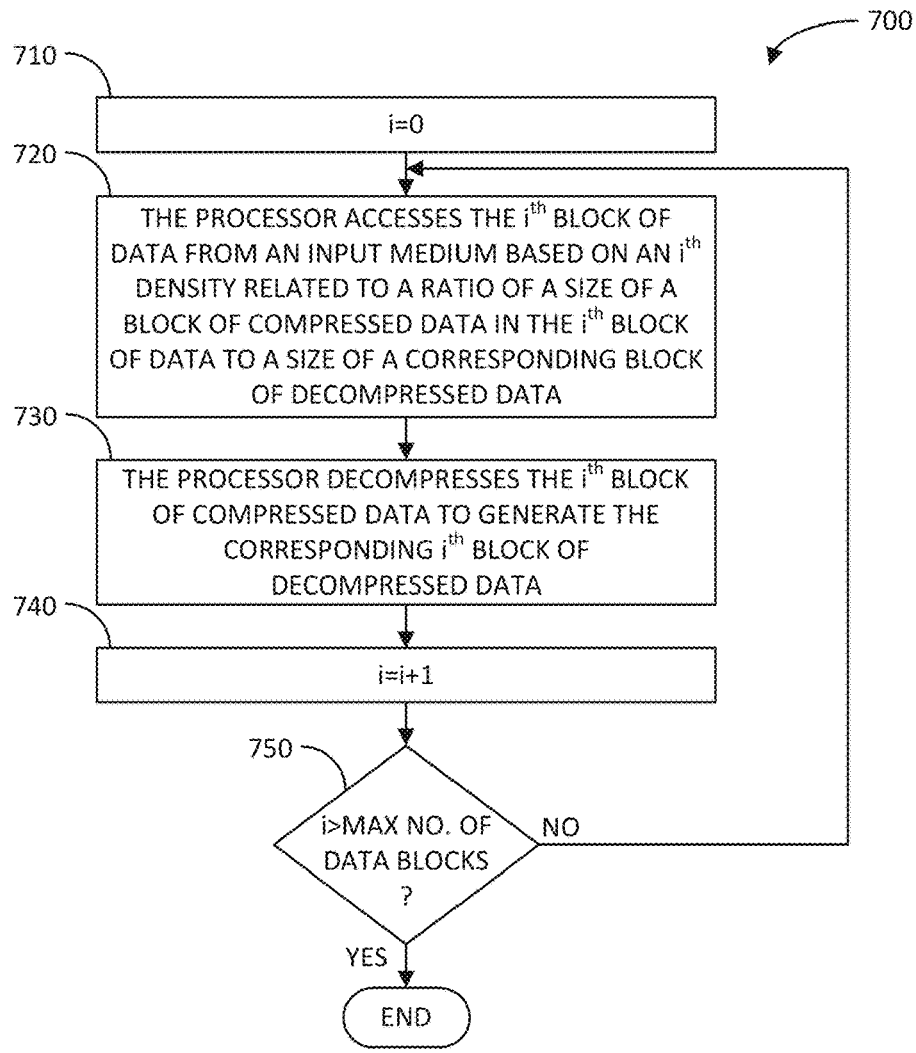
FIG. 7 illustrates a flow diagram of an example method of decompressing a set of blocks of compressed data in accordance with another aspect of the disclosure.

FIG. 7 illustrates a flow diagram of an example method 700 of decompressing a set of blocks of compressed data in accordance with another aspect of the disclosure. The method 700 may be implemented by one of the set of decompression engine processors 120-0 to 120-7 (e.g., processor 120-0).

The method 700 may include the processor (e.g., 120-0) setting an index "i" to identify the next block of data to be accessed (block 710). For example, the processor 120-0 may set i=0 to identify the block (or sub-block) of data-00 to be accessed. Then, according to the method 700, the processor (e.g., 120-0) accesses the $i^{th}$ block of data (e.g., CBLK-00 and META-D00) in an input medium (e.g., 110) based on an $i^{th}$ density (e.g., number of ones (is) in META-D00) related to a ratio of a size (number of compressed elements) of a block (or sub-block) of compressed data (e.g., CBLK-00) in the $i^{th}$ block (or sub-block) of data (e.g., -00) to a size (number of decompressed elements) of a corresponding block of compressed data (e.g., DCBLK-00) (block 720). The density may be variable or programmable from one block of data (e.g., Blk-0) to another block of data (e.g., Blk-1), and so on.

The method 700 further includes the processor (e.g., 120-0) decompressing the $i^{th}$ block (or sub-block) of compressed data (e.g., CBLK-00) to generate the corresponding $i^{th}$ block of decompressed data (e.g., DCBLK-00) (block 730). The processor may then provide the block of decompressed data to an output medium (e.g., 130). The processor (e.g., 120-0) may then increment the index $i^{th}$ (i=i+1) (block 740), and then determine whether "i" is greater than the maximum or total number of blocks of data to be accessed (block 750). If all the blocks of data to be decompressed have been decompressed as determined in block 750, the processor (e.g., 120-0) may end the decompression session. On the other hand, if there are additional one or more blocks of data to be decompressed as determined in block 750, the processor (e.g., 120-0) then proceeds to block 720 to access and then decompress the next block (or sub-block of data) (e.g., -01).

Figure 8:
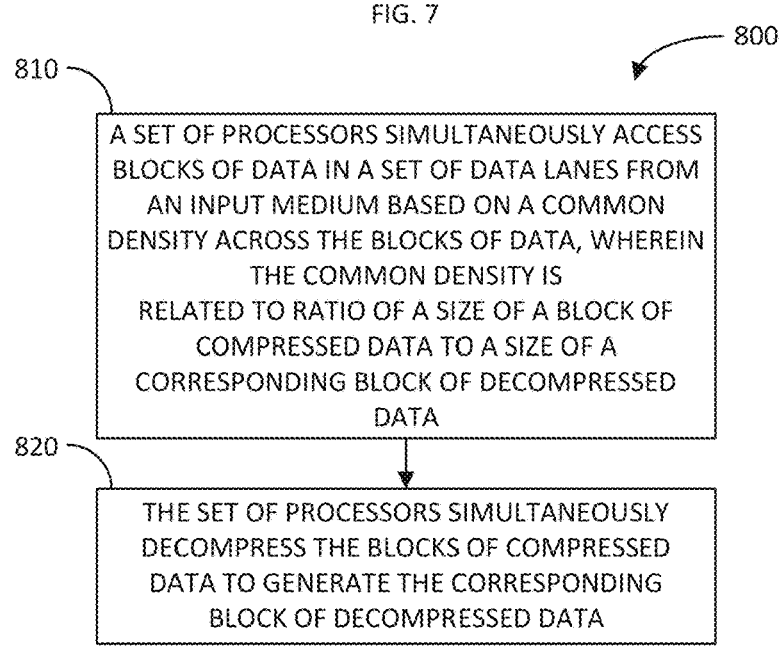
FIG. 8 illustrates a flow diagram of an example method of simultaneously decompressing a set of compressed data in parallel in accordance with another aspect of the disclosure.

FIG. 8 illustrates a flow diagram of an example method 800 of simultaneously decompressing a set of compressed data in parallel in accordance with another aspect of the disclosure. The method 800 may be implemented by the set of decompression engine SIMD processors 120-0 to 120-7.

According to the method 800, a set of SIMD processors (e.g., 120-0 to 120-7) simultaneously access blocks (or sub-blocks) of data (e.g., -00 to -07) in a set of data lanes (e.g., DL0 to DL7) based on a common density across the blocks (or sub-blocks) of data, wherein the common density is related to a ratio of a size (number of compressed elements) of a block of compressed data (e.g., CBLK-00 to CBLK-07) to a size (number of decompressed elements) of a block of decompressed data (e.g., DCBLK-00 to DCBLK-07) (block 810). Each of the set of SIMD processors (e.g., 120-0 to 120-7) may access the corresponding block of data per any one of method 500, 600, or 700 previously discussed. Then, according to the method 800, the set of SIMD processors (e.g., 120-0 to 120-7) simultaneously decompresses the blocks (or sub-blocks) of data (e.g., CBLK-00 to CBLK-07) to generate blocks of decompressed data (e.g., DCBLK-00 to DCBLK-07), respectively (block 820). The set of SIMD processors (e.g., 120-0 to 120-7) may then provide the block of decompressed data to an output medium (e.g., 130).

Figure 9:
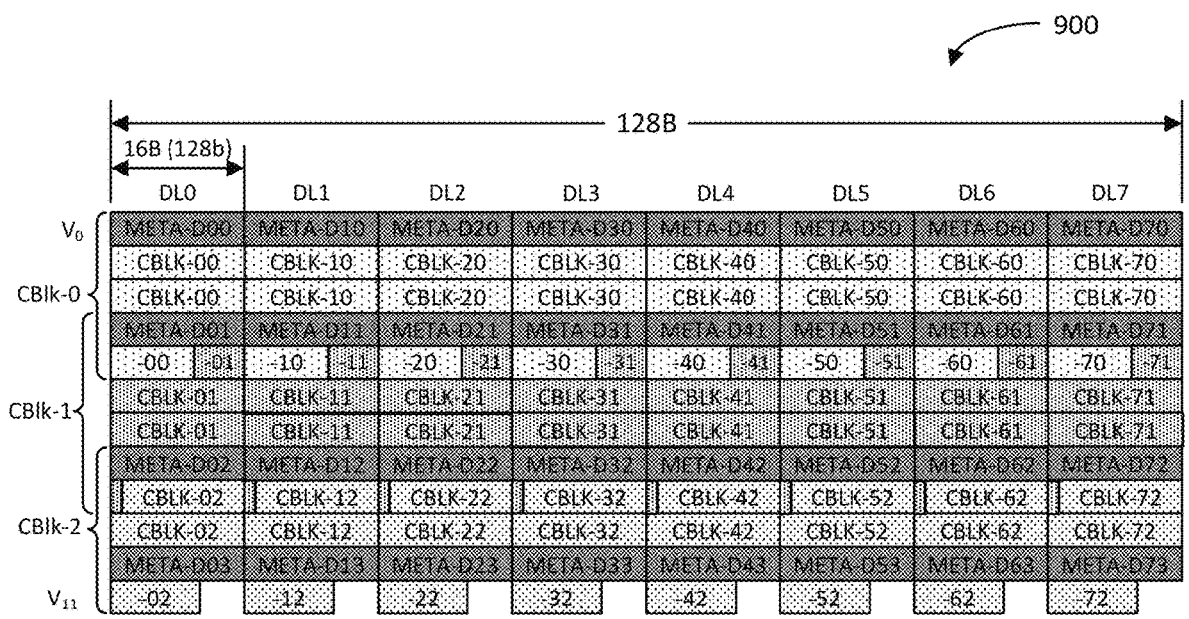
FIG. 9 illustrates a diagram of another example compressed data format in accordance with another aspect of the disclosure.

FIG. 9 illustrates a diagram of another example compressed data format 900 in accordance with another aspect of the disclosure. The compressed data format 900 is similar to compressed data format 200 with some distinctions as described further herein. That is, the compressed data is organized in a set of vectors (rows) (e.g., $V_0$ to $V_{11}$), each vector being 128 B in size (e.g., generally, any $2^n$ size). A first block of data CBlk-0 may extend from vector $V_0$ to vector $V_4$. A second block of data CBlk-1 may extend from vector $V_3$ to vector $V_9$. And, a third block of data CBLK-2 may extend from vector $V_7$ to $V_{11}$. Also similar to data format 200, the blocks of data CBLK-0 to CBLK-2 may be spread across a set of SIMD data lanes DL0 to DL7 as sub-blocks of data-00/02 to -70/-72, respectively. Each of the data lanes DL0 to DL7 may also have a data width of 128 b (e.g., or generally, any $2^m$ size).

The compressed data format 900 differs from compressed data format 200 in how the compressed data and metadata data are arranged in each sub-block of data. For example, in data format 200, each sub-block of data includes a first portion of compressed data in a particular $k^{th}$ vector, a metadata in the $k^{th}+1$ vector, and any remaining portion of compressed data in at least $k^{th}+2$ vector (e.g., the compressed data and the metadata are interleaved). Note that in data format 200, each sub-block of data is continuous as it spans across a plurality of vectors within a data lane; or in other words, a sub-block of data it is not interleaved with another sub-block of data. For example, sub-block of data-01 in data lane DL0 includes a first portion of compressed data CBLK-01 in vector $V_3$ (k=3), the metadata META-D01 in vector $V_4$ (k+1=4), and second, third, and fourth portions of the compressed data CBLK-01 in vectors $V_5$ (k+2=5), $V_6$ (k+3=6), and $V_7$ (k+4=7), respectively.

Whereas, in compressed data format 900, each sub-block of data may include a metadata in a particular vector k, a first portion of compressed data occupying at least a portion of vector k+1, a second portion of compressed data occupying at least a portion of vector k+2 (if the compressed data spans more than one (1) vector), a third portion of compressed data occupying at least a portion of vector k+3 (if the compressed data spans more than two (2) vectors), and so on. If the last portion of compressed data occupies only a portion of a vector, then the metadata of the following sub-block occupies the entire preceding vector. In such case, the following sub-block, in particular, its metadata, is interleaved with the preceding sub-block.

For example, sub-block of data-01 in data lane DL0 includes the metadata META-D01 in vector $V_3$ (k=3), a first portion of compressed data CBLK-01 within a portion of vector $V_4$ (k+1=4), a second portion of compressed data CBLK-01 occupying the entire vector $V_5$ (k+2=5) within data lane DL0, a third portion of compressed data CBLK-01 occupying the entire vector $V_6$ (k+3=6) within data lane DL0, and the last portion of compressed data CBLK-01 occupying a portion of vector $V_8$ (k+5=7). Note that the last portion of sub-block of data-00 is interleaved with the sub-block of data-01, and the last portion of sub-block of data-01 is interleaved with the sub-block of data-02, as its metadata META-D02 occupies the entire vector $V_7$ within data lane DL0.

Figure 10:
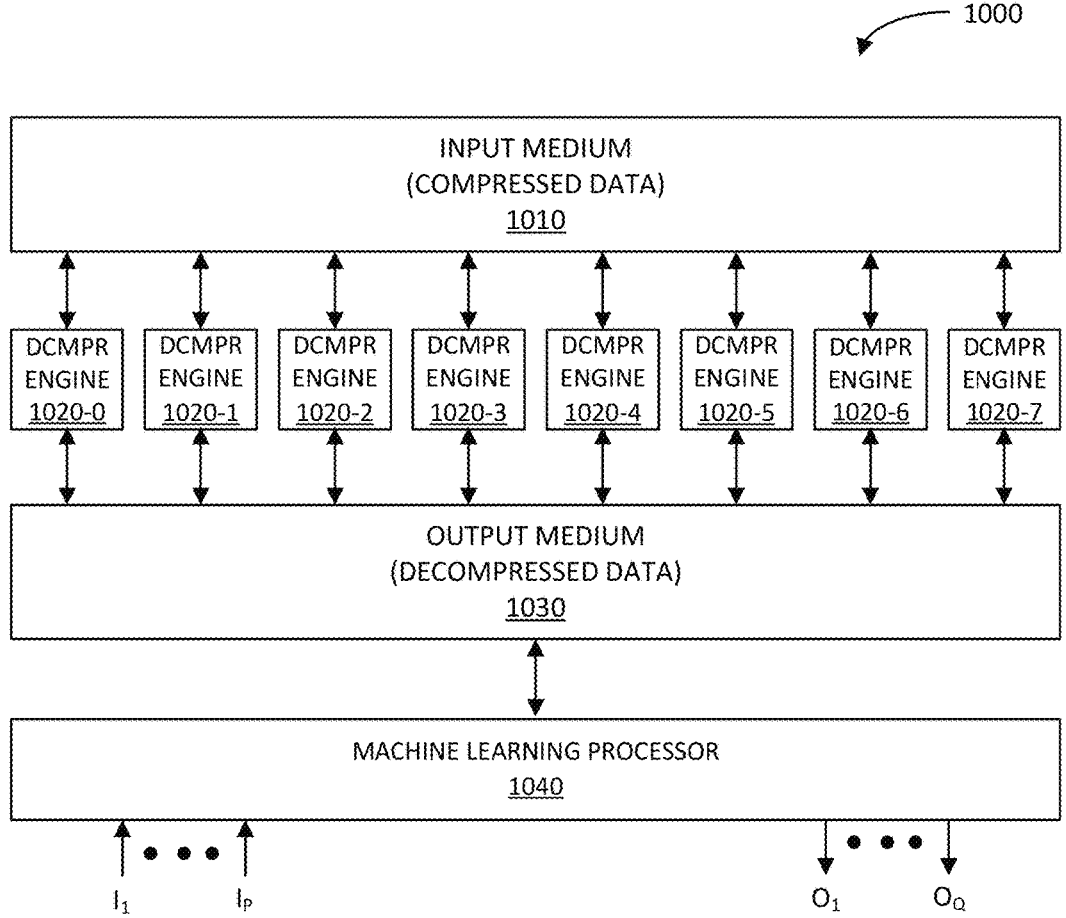
FIG. 10 illustrates a block diagram of an example machine learning (ML) data processing system in accordance with another aspect of the disclosure.

FIG. 10 illustrates a block diagram of an example machine learning (ML) data processing system 1000 in accordance with another aspect of the disclosure. The ML data processing system includes an input medium (for compressed data) 1010, a set of decompression engine SIMD processors 1020-0 to 1020-7 (eight (8) in this example, but could be more or less), an output medium (for decompressed data) 1030, and a machine learning (ML) processor 1040. The ML processor 1040 may include a set of one or more inputs $I_1$ to $I_P$ configured to receive a set of one or more input signals, respectively. The ML processor 1040 further includes a set of one or more outputs $O_1$ to $O_Q$ to produce a set of one or more output signals, respectively.

The input medium 1010 may include compressed data in accordance with the compressed data format 200 or 900. In this case, the compressed data relates to weights and/or biases for the ML processor 1040. The set of parallel SIMD processors 1020-0 to 1020-7 are configured to simultaneously access sub-blocks of compressed data of each block of data in parallel from the input medium 1010, decompress the sub-blocks of compressed data to generate sub-blocks of decompressed data in accordance with the data decompression methods described herein, and provide the sub-blocks of decompressed data to the output medium 1030. The ML processor 1040 may then access sub-blocks of decompressed data from the output medium 1030, which are ML weights and/or biases, apply the ML weights and/or biases to the set of one or more input signals $I_1$ to $I_P$, to generate a set of one or more inference output signals at the set of one or more outputs $O_1$ to $O_Q$, respectively. The ML processor 1040 may employ a convolutional matrix multiplier to perform the ML operations.

Figure 11:
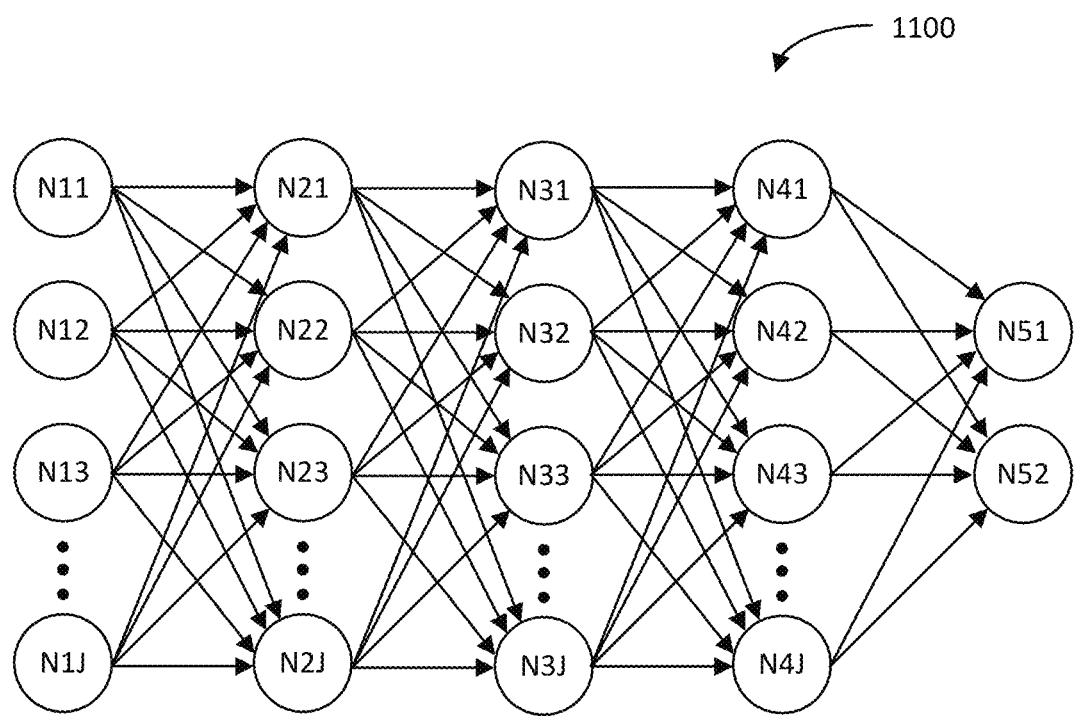
FIG. 11 illustrates a block diagram of an example machine learning (ML) neural network in accordance with another aspect of the disclosure.

FIG. 11 illustrates a block diagram of another example machine learning (ML) neural network 1100 in accordance with another aspect of the disclosure. The operations of the ML network 1100, as described further herein, may be implemented by the ML processor 1040 previously discussed.

In particular, the ML neural network 1100 includes a first hierarchical set of input neurons N11 to N1J. The first hierarchical set of input neurons N11 to N1J are configured to provide a set of input signals to a second hierarchical set of neurons N21 to N2J (sometimes referred to as hidden neurons). As discussed in more detail further herein, the second hierarchical set of neurons N21 to N2J include a first set of activation functions configured to apply a first set of weights and/or biases to the set of input signals received from the first hierarchical set of input neurons N11 to N1J to generate a first set of intermediate signals. As previously mentioned, the first set of weights and/or biases may be in compressed form in input medium 1010 and in decompressed form in output medium 1030.

The second hierarchical set of neurons N21 to N3J are configured to provide the first set of intermediate signals to a third hierarchical set of neurons N31 to N3J. The third hierarchical set of neurons N31 to N3J include a second set of activation functions configured to apply a second set of weights and/or biases to the first set of intermediate signals received from the second hierarchical set of hidden neurons N21 to N2J to generate a second set of intermediate signals. The second set of weights and/or biases may also be in compressed form in input medium 1010 and in decompressed form in output medium 1030.

The third hierarchical set of neurons N31 to N3J are configured to provide the second set of intermediate signals to a fourth hierarchical set of neurons N41 to N4J. The fourth hierarchical set of neurons N41 to N4J include a third set of activation functions configured to apply a third set of weights and/or biases to the second set of intermediate signals received from the third hierarchical set of hidden neurons N31 to N3J to generate a set of output signals. The third set of weights and/or biases may also be in compressed form in input medium 1010 and in decompressed form in output medium 1030.

The set of output signals generated by the third hierarchical set of neurons N41 to N4J are provided to a set of output neurons N51 and N52 for outputting, wherein the set of output signals provide inference information based on the set of input signals provided by the set of input neurons N11 to NiJ. It shall be understood that the ML neural network 1100 may include more or less hierarchical set of one or more neurons. Although the variable J in this example identifies a plurality of neurons per each hierarchical set, it shall be understood that J could be any positive integer (e.g., one or more). Further, in this example, each of the hierarchical set of neurons are indicated as having J neurons, it shall be understood that the number of neurons in each set may vary from set to set.

Figure 12:
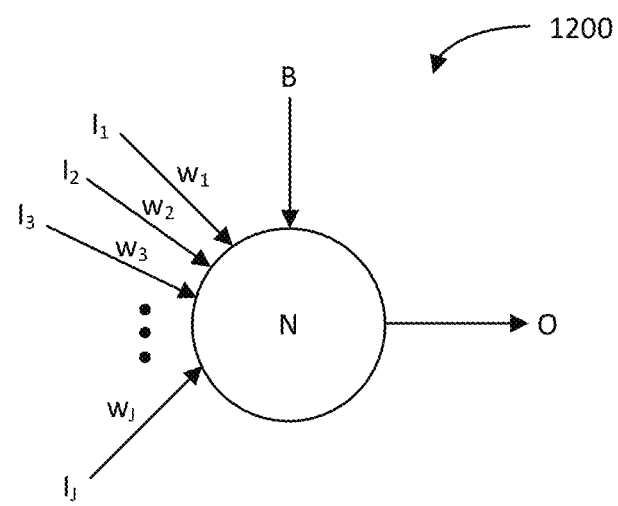
FIG. 12 illustrates a block diagram of an example machine learning (ML) neuron in accordance with another aspect of the disclosure.

FIG. 12 illustrates a block diagram of an example machine learning (ML) neuron 1200 in accordance with another aspect of the disclosure. The ML neuron 1200 may be an example of one of the neurons in neural network 1100. In particular, the neuron (N) 1200 is configured to implement an activation function entailing receiving a set of input signals $I_1$ to $I_J$, and applying a set of weights $w_1$ to $w_J$ to the set of input signals $I_1$ to $I_J$, respectively. The activation function implemented by the ML neuron 1200 may also add a bias (B) to the weighted inputs $I_1*w_1$ to $I_J*w_J$ to generate an output signal O. Thus, the activation function of the ML neuron 1200 may be given by the following equation:

$$O = B + \sum_{1}^{J} I_j * w_j$$

As previously discussed, the bias B and the weights $w_1$ to $w_J$ may be in compressed form in input medium 1010 and in decompressed form in output medium 1030.

The following provides an overview of aspects of the present disclosure:

Aspect 1: A data processing system comprising: an input medium configured to include a first set of blocks of data including a first set of blocks of compressed data and a first set of metadata, respectively; an output medium configured to include a first set of blocks of decompressed data each having a predetermined number of decompressed elements; and a set of single instruction multiple data (SIMD) processors configured to: access the first set of blocks of data from the input medium, respectively; decompress the first set of blocks of compressed data to generate the first set of blocks of decompressed data based on the first set of metadata, respectively; and provide the first set of blocks of decompressed data to the output medium, respectively.

Aspect 2: The data processing system of aspect 1, wherein the predetermined number of decompressed elements in each of the first set of blocks of decompressed data is programmable.

Aspect 3: The data processing system of aspect 1 or 2, wherein the predetermined number of decompressed elements in each of the first set of blocks of decompressed data is fixed.

Aspect 4: The data processing system of any one of aspects 1-3, wherein a size of each of the compressed and decompressed elements is programmable.

Aspect 5: The data processing system of any one of aspects 1-3, wherein a size of each of the compressed and decompressed elements is programmable.

Aspect 6: The data processing system of any one of aspects 1-5, wherein a density of compressed elements in each of the first set of blocks of compressed data to decompressed elements in each of the first set of blocks of decompressed data is programmable.

Aspect 7: The data processing system of any one of aspects 1-5, wherein a density of compressed elements in each of the first set of blocks of compressed data to decompressed elements in each of the first set of blocks of decompressed data is fixed.

Aspect 8: The data processing system of any one of aspects 1-6, wherein each of the set of SIMD processors is configured to decompress the corresponding first block of compressed data including: for each first bit value in the corresponding metadata, copying the next compressed element of the first block of compressed data into the next decompressed element of the first block of decompressed data; and for each second bit value in the corresponding metadata, setting the next decompressed element in the first block of decompressed data to a zero.

Aspect 9: The data processing system of aspect 8, wherein a size of each element of the first set of blocks of compressed and decompressed data is a byte.

Aspect 10: The data processing system of any one of aspects 1-9, wherein the compressed data is interleaved with the metadata in each of the first set of blocks of compressed data in the input medium.

Aspect 11: The data processing system of any one of aspects 1-9, wherein the compressed data follows the metadata in each of the first set of blocks of compressed data in the input medium.

Aspect 12: The data processing system of any one of aspects 1-11, wherein the input medium or the output medium comprises a memory.

Aspect 13: The data processing system of any one of aspects 1-11, wherein the input medium or the output medium comprises a data transient medium.

Aspect 14: The data processing system of any one of aspects 1-13, wherein the first set of blocks of compressed data pertain to a set of SIMD data lanes accessible by the set of SIMD processors, respectively.

Aspect 15: The data processing system of any one of aspects 1-14, wherein the first set of blocks of decompressed data pertain to a set of SIMD data lanes accessible by the set of SIMD processors, respectively.

Aspect 16: The data processing system of any one of aspects 1-15, wherein the set of SIMD processors are further configured to: access a second block of data from the input medium, wherein the second block of data includes a second set of blocks of compressed data and a second set of metadata, respectively; decompress the second set of blocks of compressed data to generate a second set of blocks of decompressed data each having the predetermined number of decompressed elements based on the second metadata, respectively; and provide the second set of blocks of decompressed data into the output medium, respectively.

Aspect 17: The data processing system of aspect 16, wherein a number of compressed elements in the first set of blocks of data is the same as the number of compressed elements in the second set of blocks of data.

Aspect 18: The data processing system of aspect 16, wherein a number of compressed elements in the first set of blocks of data is different than a number of compressed elements in the second set of blocks of data.

Aspect 19: The data processing system of any one of aspects 16-18, wherein the first set of blocks of data is not interleaved with the second set of blocks of data in the input medium.

Aspect 20: The data processing system of any one of aspects 16-18, wherein the first set of blocks of data is interleaved with the second set of blocks of data in the input medium.

Aspect 21: The data processing system of any one of aspects 16 to 20, wherein: the first set of blocks of data begins with at least a portion of the first set of blocks of compressed data followed by the first set of metadata in the input medium, respectively; and the second set of blocks of data begins with at least a portion of the second set of blocks of compressed data followed by the second set of metadata in the input medium, respectively.

Aspect 22: The data processing system of any one of aspects 16-20, wherein: the first set of blocks of data begins with the first set of metadata followed by the first set of blocks of compressed data in the input medium, respectively; and the second set of blocks of data begins the second set of metadata followed by the second set of blocks of compressed data in the input medium, respectively.

Aspect 23: The data processing system of aspect 22, wherein portions of the first set of blocks of compressed data follow the second set of metadata in the input medium, respectively.

Aspect 24: A data processing system comprising: an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data; an output medium configured to include a first block of decompressed data including a first set of sub-blocks of decompressed data with the same predetermined number of decompressed elements in the set of SIMD data lanes, respectively; a set of SIMD processors configured to: access the first set of sub-blocks of data from the input medium, respectively; decompress the first set of sub-blocks of compressed data to generate the first set of sub-blocks of decompressed data based on the first set of metadata, respectively; and provide the first set of sub-blocks of decompressed data to the output medium.

Aspect 25: A machine learning (ML) data processing system, comprising: an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data; an output medium configured to include a first block of decompressed data including a first set of sub-blocks of decompressed data in the set of SIMD data lanes, respectively; a set of SIMD processors configured to: access the first set of sub-blocks of data from the input medium, respectively; decompress the first set of sub-blocks of compressed data to generate the first set of sub-blocks of decompressed data based on the first set of metadata, respectively; and provide the first set of sub-blocks of decompressed data to the output medium; and a machine learning (ML) processor configured to: access the first set of sub-blocks of decompressed data from the output medium, wherein the first set of sub-blocks of decompressed includes machine learning (ML) weights; and apply the ML weights to a set of input signals to generate a set of output signals.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. A data processing system, comprising:
   an input medium configured to include a first set of blocks of data including a first set of blocks of compressed data and a first set of metadata, respectively;
   an output medium configured to include a first set of blocks of decompressed data each having a predetermined number of decompressed elements; and
   a set of single instruction multiple data (SIMD) processors configured to:
      access the first set of blocks of data from the input medium, respectively;
      decompress the first set of blocks of compressed data to generate the first set of blocks of decompressed data based on the first set of metadata, respectively; and
      provide the first set of blocks of decompressed data to the output medium, respectively,
   wherein each of the set of SIMD processors is configured to decompress the corresponding first block of compressed data including:
      for each first bit value in the corresponding metadata, copying the next compressed element of the first block of compressed data into the next decompressed element of the first block of decompressed data; and
      for each second bit value in the corresponding metadata, setting the next decompressed element in the first block of decompressed data to a zero.

2. The data processing system of claim 1, wherein the predetermined number of decompressed elements in each of the first set of blocks of decompressed data is programmable.

3. The data processing system of claim 1, wherein the predetermined number of decompressed elements in each of the first set of blocks of decompressed data is fixed.

4. The data processing system of claim 1, wherein a size of each of the compressed and decompressed elements is programmable.

5. The data processing system of claim 1, wherein a size of each of the compressed and decompressed elements is fixed.

6. The data processing system of claim 1, wherein a density of compressed elements in each of the first set of blocks of compressed data to decompressed elements in each of the first set of blocks of decompressed data is programmable.

7. The data processing system of claim 1, wherein a density of compressed elements in each of the first set of blocks of compressed data to decompressed elements in each of the first set of blocks of decompressed data is fixed.

8. The data processing system of claim 1, wherein a size of each element of the first set of blocks of compressed and decompressed data is a byte.

9. The data processing system of claim 1, wherein the compressed data is interleaved with the metadata in each of the first set of blocks of compressed data in the input medium.

10. The data processing system of claim 1, wherein the compressed data follows the metadata in each of the first set of blocks of compressed data in the input medium.

11. The data processing system of claim 1, wherein the input medium or the output medium comprises a memory.

12. The data processing system of claim 1, wherein the input medium or the output medium comprises a data transient medium.

13. The data processing system of claim 1, wherein the first set of blocks of compressed data pertain to a set of SIMD data lanes accessible by the set of SIMD processors, respectively.

14. The data processing system of claim 1, wherein the first set of blocks of decompressed data pertain to a set of SIMD data lanes accessible by the set of SIMD processors, respectively.

15. The data processing system of claim 1, wherein the set of SIMD processors are further configured to:
   access a second block of data from the input medium, wherein the second block of data includes a second set of blocks of compressed data and a second set of metadata, respectively;
   decompress the second set of blocks of compressed data to generate a second set of blocks of decompressed data each having the predetermined number of decompressed elements based on the second set of metadata, respectively; and
   provide the second set of blocks of decompressed data to the output medium, respectively.

16. The data processing system of claim 15, wherein a number of compressed elements in the first set of blocks of data is the same as the number of compressed elements in the second set of blocks of data.

17. The data processing system of claim 15, wherein a number of compressed elements in the first set of blocks of data is different than a number of compressed elements in the second set of blocks of data.

18. The data processing system of claim 15, wherein the first set of blocks of data is not interleaved with the second set of blocks of data in the input medium.

19. The data processing system of claim 15, wherein the first set of blocks of data is interleaved with the second set of blocks of data in the input medium.

20. The data processing system of claim 15, wherein:
   the first set of blocks of data begins with at least a portion of the first set of blocks of compressed data followed by the first set of metadata in the input medium, respectively; and
   the second set of blocks of data begins with at least a portion of the second set of blocks of compressed data followed by the second set of metadata in the input medium, respectively.

21. The data processing system of claim 15, wherein:
   the first set of blocks of data begins with the first set of metadata followed by the first set of blocks of compressed data in the input medium, respectively; and
   the second set of blocks of data begins with the second set of metadata followed by the second set of blocks of compressed data followed by the second set of metadata in the input medium, respectively.

22. The data processing system of claim 21, wherein portions of the first set of blocks of compressed data follow the second set of metadata in the input medium, respectively.

23. A data processing system, comprising:
   an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data;
   an output medium configured to include a first block of decompressed data including a first set of sub-blocks of decompressed data with the same predetermined number of decompressed elements in the set of SIMD data lanes, respectively; and a set of SIMD processors configured to:
- access the first set of sub-blocks of data from the input medium, respectively;
- decompress the first set of sub-blocks of compressed data to generate the first set of sub-blocks of decompressed data based on the first set of metadata, respectively; and
- provide the first set of sub-blocks of decompressed data to the output medium, wherein each of the set of SIMD processors is configured to decompress the corresponding first set of sub-block of compressed data including:
- for each first bit value in the corresponding metadata, copying the next compressed element of the first sub-block of compressed data into the next decompressed element of the first sub-block of decompressed data; and
- for each second bit value in the corresponding metadata, setting the next decompressed element in the first sub-block of decompressed data to a zero.

24. A machine learning (ML) data processing system, comprising:

an input medium configured to include a first block of data including a first set of sub-blocks of data in a set of single instruction multiple data (SIMD) data lanes, wherein the first set of sub-blocks of data includes a first set of compressed data and a first set of metadata, respectively, and wherein the first set of metadata indicates the same number of compressed elements in each of the first set of compressed data;

an output medium configured to include a first block of decompressed data including a first set of sub-blocks of decompressed data with the same number of decompressed elements in the set of SIMD data lanes, respectively;

a set of SIMD processors configured to:
- access the first set of sub-blocks of data from the input medium, respectively;
- decompress the first set of sub-blocks of compressed data to generate the first set of sub-blocks of decompressed data based on the first set of metadata, respectively; and
- provide the first set of sub-blocks of decompressed data to the output medium; and a machine learning (ML) processor configured to:
- access the first set of sub-blocks of decompressed data from the output medium, wherein the first set of sub-blocks of decompressed includes machine learning (ML) weights; and apply the ML weights to a set of input signals to generate a set of output signals.

* * * * *